US012001728B2

(12) United States Patent
Li et al.

(10) Patent No.: US 12,001,728 B2
(45) Date of Patent: Jun. 4, 2024

(54) METHOD, APPARATUS, AND SYSTEM FOR PRINTING FILE BASED ON PRINT REQUEST GENERATED ON VIRTUAL MACHINE HAVING VIRTUAL PRINTER INSTALLED IN IT AND SEND THE PRINT REQUEST TO TERMINAL DEVICE (71) Applicant: Huawei Technologies Co., Ltd., Shenzhen (CN)

(72) Inventors: Junjie Li, Shenzhen (CN); Qingling Duan, Shenzhen (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 33 days.

(21) Appl. No.: 17/536,844

(22) Filed: Nov. 29, 2021

(65) Prior Publication Data
US 2022/0083286 A1 Mar. 17, 2022

Related U.S. Application Data (63) Continuation of application No. PCT/CN2019/089327, filed on May 30, 2019.

(51) Int. Cl.
G06F 3/12 (2006.01)
H04N 1/00 (2006.01)

(52) U.S. Cl.
CPC .......... G06F 3/1204 (2013.01); G06F 3/1231 (2013.01); G06F 3/1253 (2013.01);
(Continued)

(58) Field of Classification Search
USPC ............................... 358/1.13–1.15
See application file for complete search history.

(56) References Cited

U.S. PATENT DOCUMENTS 10,152,290 B1* 12/2018 Khalyapin ............ G06F 3/1232
2007/0182993 A1* 8/2007 Yamada ................. G06F 3/122
358/448

(Continued)

FOREIGN PATENT DOCUMENTS

CN 102404308 A 4/2012
CN 105183403 A 12/2015

(Continued)

OTHER PUBLICATIONS

Liangchen, W., "Realization of Printer Mapping Function Based on Windows Universal Printer Driver," Science Education Journal, Jun. 2018, with a machine translation, 6 pages.

Primary Examiner — Haris Sabah
(74) Attorney, Agent, or Firm — Conley Rose, P.C.

(57) ABSTRACT

A virtual machine responds to an operation of a user and generates a print request. The print request includes a to-be-printed file, virtual printer information, and a print parameter of the to-be-printed file. A virtual printer corresponds to a printer coupled to a terminal device. The virtual printer information indicates the printer corresponding to the virtual printer. After generating the print request, the virtual machine sends the print request to the terminal device to instruct the terminal device to print the to-be-printed file using the printer corresponding to the virtual printer information. After receiving the print request, the terminal device determines the printer based on the virtual printer information.

21 Claims, 5 Drawing Sheets (52) U.S. Cl.
CPC ............ *G06F 3/1285* (2013.01); *G06F 3/121* (2013.01); *H04N 1/00928* (2013.01)

(56) References Cited

U.S. PATENT DOCUMENTS

| | | | | |
|---|---|---|---|---|
| 2012/0019855 | A1* | 1/2012 | Takahashi | G06F 3/1237 |
| | | | | 358/1.15 |
| 2013/0077125 | A1* | 3/2013 | Kitagata | G06F 3/126 |
| | | | | 358/1.14 |
| 2013/0148155 | A1* | 6/2013 | Kitagata | G06F 3/1272 |
| | | | | 358/1.15 |
| 2013/0235418 | A1* | 9/2013 | Tanaka | H04L 63/08 |
| | | | | 358/1.15 |
| 2015/0160899 | A1* | 6/2015 | Lee | G06F 3/1288 |
| | | | | 358/1.15 |
| 2015/0309759 | A1 | 10/2015 | Mori | |
| 2016/0328187 | A1 | 11/2016 | Nathani et al. | |
| 2017/0048405 | A1* | 2/2017 | Park | H04N 1/32609 |
| 2019/0227755 | A1* | 7/2019 | Yamazaki | G06F 3/1254 |

FOREIGN PATENT DOCUMENTS

| | | |
|---|---|---|
| CN | 106557288 A | 4/2017 |
| CN | 107562391 A | 1/2018 |
| CN | 107636603 A | 1/2018 |
| CN | 108170383 A | 6/2018 |
| EP | 1471418 A2 | 10/2004 |
| JP | 2004240589 A | 8/2004 |
| WO | 2010053622 A1 | 5/2010 |

\* cited by examiner

METHOD, APPARATUS, AND SYSTEM FOR PRINTING FILE BASED ON PRINT REQUEST GENERATED ON VIRTUAL MACHINE HAVING VIRTUAL PRINTER INSTALLED IN IT AND SEND THE PRINT REQUEST TO TERMINAL DEVICE

CROSS-REFERENCE TO RELATED APPLICATIONS

This is a continuation of International Patent Application No. PCT/CN2019/089327 filed on May 30, 2019, the disclosure of which is hereby incorporated by reference in its entirety.

TECHNICAL FIELD

This application relates to the field of computer technologies, and in particular, to a method, an apparatus, and a system for printing a file on a virtual machine by using a terminal device.

BACKGROUND

Virtual desktop is a desktop system of a computer that is virtualized and used as a desktop of a virtual machine. A user may use a terminal device to remotely access the virtual machine over a network, and the virtual machine interacts with the user through the virtual desktop. After logging in to the virtual machine, the user may use the virtual desktop to work on the terminal device as on a personal computer. For example, a conference call is made by using a camera of the terminal device and video software on the virtual machine, a file on the virtual machine is printed by using a printer connected to the terminal device, or a document is written by using a keyboard of the terminal device and office software on the virtual machine.

A process in which the user prints the file on the virtual machine by using the terminal device is as follows. The user selects a to-be-printed file on the virtual machine by using the virtual desktop, and sets a print parameter for the to-be-printed file on a configuration screen of a virtual printer installed on the virtual machine. The virtual machine responds to a print operation of the user, convert the to-be-printed file into a portable document format (PDF) file, and sends the PDF file to the terminal device. An operating system of the terminal device, for example, an ANDROID system, has a print interface. Therefore, when a print request is received, a print configuration screen of the operating system is displayed for the user to select a printer and set a print parameter. Then, the print parameter set on the terminal device is sent to the selected printer for printing the file.

In the foregoing method for printing the file, both the virtual machine and the terminal device provide printing screens for the user to set the printing parameters. This makes a file printing process complex.

SUMMARY

This application provides a method, an apparatus, and a system for printing a file on a virtual machine by using a terminal device, to resolve a problem that a file printing process is relatively complex in a virtual desktop scenario.

According to a first aspect, an embodiment of this application provides a method for printing a file on a virtual machine by using a terminal device. The method is applied to the virtual machine. At least one virtual printer is installed on the virtual machine and a user may access the virtual machine by using the terminal device. In the method, the virtual machine may detect an operation of the user, respond to the operation of the user, and generate a print request. The print request includes a to-be-printed file and virtual printer information, and optionally, may further include a print parameter of the to-be-printed file. The virtual printer corresponds to a printer connected to the terminal device, and the virtual printer information may indicate the printer corresponding to the virtual printer. After generating the print request, the virtual machine may send the print request to the terminal device, to instruct the terminal device to print the to-be-printed file by using the printer corresponding to the virtual printer information.

According to the method, when the user needs to print the file, in addition to sending the to-be-printed file, the virtual machine may send the virtual printer information. Because the virtual printer information may correspond to the printer connected to the terminal device, after receiving the print request, the terminal device may determine the printer based on the virtual printer information, and the user does not need to configure the printer again. This can effectively shorten printing time and improve file printing efficiency.

In a possible design, to establish a correspondence between the virtual printer and the printer connected to the terminal device, before generating the print request, the virtual machine may receive device information of the printer sent by the terminal device, and the device information includes an identifier of the printer. Then, the virtual printer may be installed on the virtual machine, and an identifier of the virtual printer is set as the identifier of the printer.

According to the method, the virtual machine may learn the device information of the printer. In this way, during installation, the virtual printer whose identifier is consistent with the identifier of the printer may be installed, and the correspondence between the virtual printer and the printer connected to the terminal device is established. Therefore, when the user subsequently needs to print the file, the virtual machine indicates the corresponding printer by sending the virtual printer information.

In a possible design, in addition to the identifier of the printer, the device information may further include other information. For example, the device information may include print configuration information supported by the printer. When the virtual printer is installed on the virtual machine, the virtual printer may be configured based on the print configuration information supported by the printer. In this way, configuration of the virtual printer may be the same as configuration of the corresponding printer.

According to the method, the configuration of the virtual printer is the same as the configuration of the corresponding printer, so that the virtual printer can reflect configuration information supported by the corresponding printer, and a preview screen of the virtual printer may display the same configuration as the corresponding printer.

In a possible design, the virtual printer may be installed or uninstalled on the virtual machine. For example, after receiving a notification message that is sent by the terminal device and that indicates that the printer is offline, the virtual machine may uninstall the virtual printer corresponding to the printer.

According to the method, when the printer is offline, the virtual machine may uninstall the virtual printer in real time, to ensure that the printer corresponding to the virtual printer can be used for printing. In this way, a hot swap function of the printer is implemented, and installation and uninstallation of the virtual printer can be flexibly controlled.

According to a second aspect, an embodiment of this application provides a method for printing a file on a virtual machine by using a terminal device. The method is applied to the terminal device and the terminal device may be connected to one or more printers. In the method, the terminal device may receive a print request from the virtual machine. The print request includes a to-be-printed file and virtual printer information. Optionally, the print request may further include a print parameter of the to-be-printed file. A virtual printer indicated by the virtual printer information is installed on the virtual machine and corresponds to a printer connected to the terminal device. Then, the terminal device may determine, based on the virtual printer information, the printer corresponding to the virtual printer. After the printer is determined, the to-be-printed file may be printed by using the determined printer. For example, the terminal device may print the to-be-printed file by using the determined printer based on the print parameter of the to-be-printed file.

According to the method, in addition to the to-be-printed file, the print request that is received by the terminal device from the virtual machine may further include the virtual printer information. Because the printer connected to the terminal device is in a one-to-one correspondence with the virtual printer on the virtual machine, the corresponding printer may be determined by using the virtual printer information. In this way, a user does not need to select the printer again, printing process can be effectively shortened, and file printing efficiency can be improved. If the print request further includes a print parameter, the terminal device may print the to-be-printed file by using the determined printer based on the print parameter. Similarly, the user does not need to set the print parameter again, and the file can be printed more efficiently.

In a possible design, the terminal device has a capability of obtaining device information of the printer connected to the terminal device. After the device information of the printer connected to the terminal device is obtained, where the device information includes an identifier of the printer, the terminal device may send an installation instruction to the virtual machine. The installation instruction includes the device information, and is used to instruct the virtual machine to install the virtual printer based on the device information.

According to the method, the terminal device may send the obtained device information of the printer to the virtual machine, so that the corresponding virtual printer can be locally installed on the virtual machine.

In a possible design, in addition to the identifier of the printer, the device information may further include other information. For example, the device information may include print configuration information supported by the printer.

According to the method, the device information includes the print configuration information supported by the printer, so that the virtual printer having the same configuration as the corresponding printer can be locally installed on the virtual machine.

In a possible design, after sending the installing instruction to the virtual machine, if the terminal device detects that the printer is offline, the terminal device may send a notification message indicating that the printer is offline to the virtual machine.

According to the method, the terminal device may notify, in real time based on a status of the printer, the virtual machine that the printer is offline, so that after receiving the notification message, the virtual machine may uninstall the virtual printer in real time, and may dynamically adjust the correspondence between the virtual printer and the printer.

According to a third aspect, an embodiment of this application further provides a virtual machine. The virtual machine may be deployed in a service, and at least one virtual printer is installed on the virtual machine. A user may access the virtual machine by using a terminal device. For beneficial effects, refer to the description in the first aspect. Details are not described herein again. The apparatus has a function of implementing an action in the method example in the first aspect. The function may be implemented by hardware, or may be implemented by hardware executing corresponding software. The hardware or software includes one or more modules corresponding to the foregoing functions. In a possible design, a structure of the apparatus includes a request generation unit and a desktop protocol server. These units may perform corresponding functions in the method example in the first aspect. For details, refer to detailed description in the method example. Details are not described herein again.

According to a fourth aspect, an embodiment of this application further provides a terminal device, and the terminal device is connected to a printer. For beneficial effects, refer to the description in the second aspect. Details are not described herein again. The apparatus has a function of implementing an action in the method example in the second aspect. The function may be implemented by hardware, or may be implemented by hardware executing corresponding software. The hardware or software includes one or more modules corresponding to the foregoing functions. In a possible design, a structure of the apparatus includes a client and a processing module. These units may perform corresponding functions in the method example in the second aspect. For details, refer to detailed description in the method example. Details are not described herein again.

According to a fifth aspect, an embodiment of this application further provides a virtual machine. For beneficial effects, refer to the description in the first aspect. Details are not described herein again. A structure of the communications apparatus includes a processor and a memory. The processor is configured to support a terminal to perform a corresponding function in the method in the first aspect. The memory is coupled to the processor, and stores a necessary program instruction and necessary data of the communications apparatus. The structure of the communications apparatus further includes a communications interface configured to communicate with another device.

According to a sixth aspect, an embodiment of this application further provides a terminal device. For beneficial effects, refer to the description in the second aspect. Details are not described herein again. A structure of the communications apparatus includes a processor and a memory. The processor is configured to support a terminal to perform a corresponding function in the method in the second aspect. The memory is coupled to the processor, and stores a necessary program instruction and necessary data of the communications apparatus. The structure of the communications apparatus further includes a communications interface configured to communicate with another device.

According to a seventh aspect, an embodiment of this application further provides a file printing system. The system includes a virtual machine and a terminal device, and at least one virtual printer is installed on the virtual machine. The virtual machine may respond to an operation of a user, and generate a print request. The print request includes a to-be-printed file and virtual printer information. The virtual printer information corresponds to a printer connected to the terminal device. The virtual machine may also send the print request to the terminal device, and the print request is used to instruct the terminal device to print the to-be-printed file by using the printer corresponding to the virtual printer information.

The terminal device is connected to the printer. The terminal device may receive the print request from the virtual machine, determine, based on the virtual printer information, the printer corresponding to the virtual printer, and print the to-be-printed file by using the determined printer.

According to an eighth aspect, this application further provides a computer-readable storage medium. The computer-readable storage medium stores an instruction, and when the instruction is run on a computer, the computer is enabled to perform the methods in the foregoing aspects.

According to a ninth aspect, this application further provides a computer program product including an instruction. When the computer program product runs on a computer, the computer is enabled to perform the methods in the foregoing aspects.

According to a tenth aspect, this application further provides a computer chip. The chip is connected to a memory. The chip is configured to read and execute a software program stored in the memory, to perform the methods in the foregoing aspects.

DESCRIPTION OF EMBODIMENTS

A method and an apparatus for printing a file on a virtual machine by using a terminal device in this application are based on a same concept. Because problem-resolving principles of the method and the apparatus are similar, mutual reference may be made between implementations of the apparatus and the method, and repeated parts are not described herein.

Figure 1:
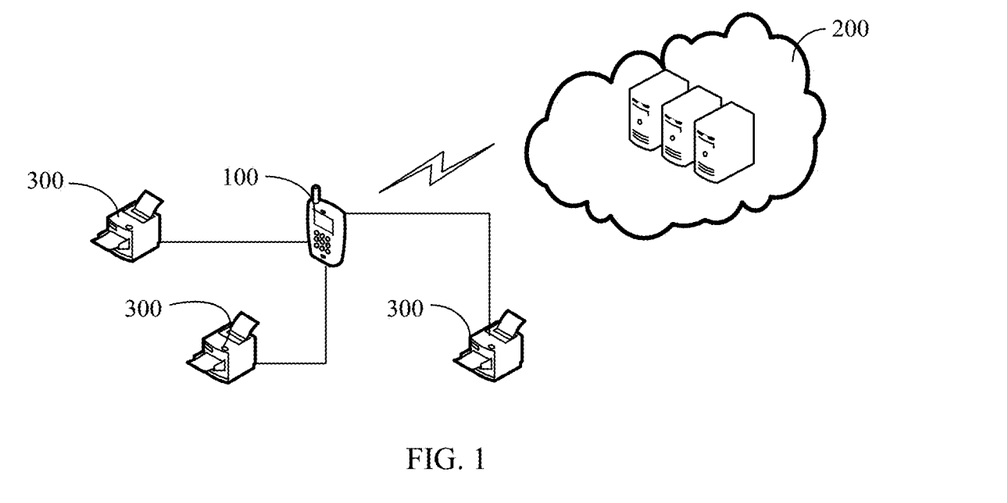
FIG. 1 is an architectural diagram of a network system according to an embodiment of this application.

FIG. 1 is an architectural diagram of a system to which an embodiment of this application is applicable. The system includes a terminal device 100 and a server 200. The terminal device 100 may be connected to the server 200 by using a wireless network or a wired network. A type of a network between the terminal device 100 and the server 200 is not limited in this embodiment of this application, and may be the internet, or a local area network.

In this embodiment of this application, the server 200 may be deployed in a data center or on an edge station, and has a relatively strong computing capability. The server 200 may be a hyper-multi-core server, a large distributed computer, a cluster computer with hardware resource pooling, or the like. One or more virtual machines may be deployed on the server 200, and the server 200 allows another device to remotely access the virtual machines for data transmission.

In this embodiment of this application, the terminal device 100 may also be referred to as a user equipment (UE). The terminal device 100 may be a device having a receiving and sending function and a flexible location. For example, the terminal device 100 may be deployed on land, including indoor and outdoor, or the terminal device 100 may be a handheld device, or a vehicle-mounted device. The terminal device 100 may also be deployed on water (such as on a ship), or be deployed in the air (such as on an aircraft, a balloon, a satellite). The terminal device 100 may be a mobile phone, a tablet computer (or an IPAD), a notebook computer, a set-top box, a virtual reality (VR) terminal, an augmented reality (AR) terminal, a wireless terminal for industrial control, a wireless terminal for self driving, a terminal for remote medical, a terminal for a smart grid, a terminal for transportation safety, and a terminal for a smart city, a terminal for a smart home, or the like. In this embodiment of this application, the terminal device 100 may be connected to a printer 300. The terminal device 100 may also establish a connection to the one or more virtual machines on the server 200 by using a network.

In this embodiment of this application, the system shown in FIG. 1 may further include one or more printers 300. The terminal device 100 may be connected to the printers 300 by using wireless interfaces or wired interfaces. A connection manner between the terminal device 100 and a printer 300 is not limited in this embodiment of this application. For example, the connection manner may be a wired connection or a wireless connection.

In this embodiment of this application, the terminal device 100 may obtain device information of the one or more printers 300 connected to the terminal device 100, and may send the obtained device information to the one or more virtual machines on the server 200 by using the network. Virtual printers corresponding to the printers 300 connected to the terminal device 100 may be locally installed on the virtual machines on the server 200. Installation of the virtual printers is described in detail below.

Figure 2:
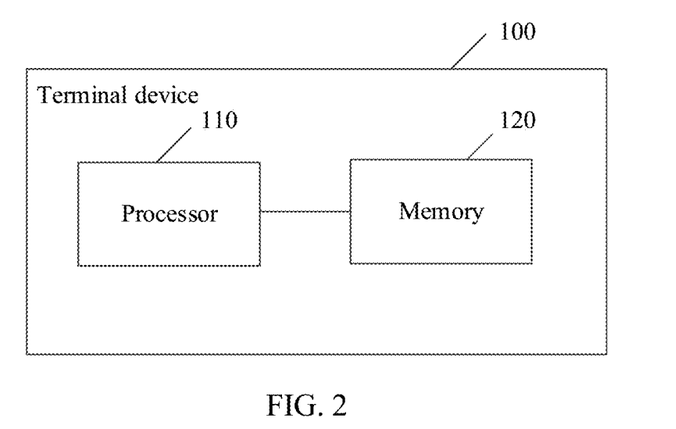
FIG. 2 is a schematic structural diagram of a terminal device according to an embodiment of this application.

FIG. 2 is a schematic structural diagram of a terminal device 100 according to an embodiment of this application. The terminal device 100 includes a processor 110 and a memory 120. The memory 120 may store a program instruction. For example, the memory 120 may be a volatile memory, for example, a random-access memory (RAM). Alternatively, the memory 120 may be a non-volatile memory, for example, a read-only memory (ROM), a flash memory, a hard disk drive (HDD), a solid-state drive (SSD), or another medium that can store a program instruction, but is not limited thereto. Alternatively, the memory 120 may be a combination of the memories.

In the apparatus shown in FIG. 2, an independent data receiving and sending module, for example, a communications interface, may be further disposed on the terminal device 100, and is configured to receive and send data. When communicating with another device, the processor 110 transmits data by using the communications interface. The processor 110 invokes the program instruction stored in the memory 120 to perform some operations. For example, the processor 110 may be configured to perform a method performed by the terminal device 100 in an embodiment shown in FIG. 4.

Figure 3:
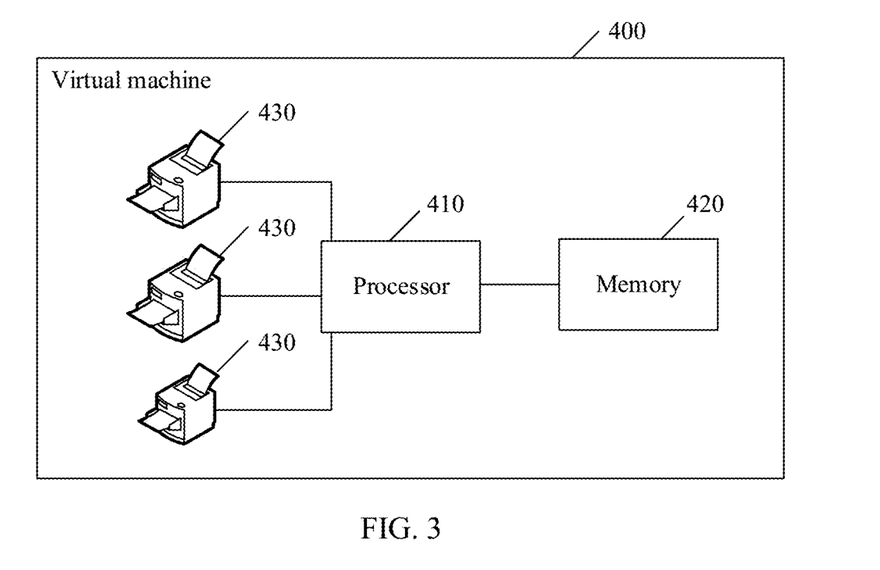
FIG. 3 is a schematic structural diagram of a virtual machine according to an embodiment of this application.

FIG. 3 is a schematic structural diagram of a virtual machine according to an embodiment of this application. A virtual machine 400 includes a processor 410 and a memory 420. The processor 410 and the memory 420 are virtual resources allocated by a server 200 to the virtual machine 400, and physical entities of the processor 410 and the memory 410 are a processor and a memory on the server 200. For a specific type of the memory 420 and a function corresponding to the processor 410, refer to related descriptions of the memory 110 and the processor 120. Details are not described herein again.

Figure 4:
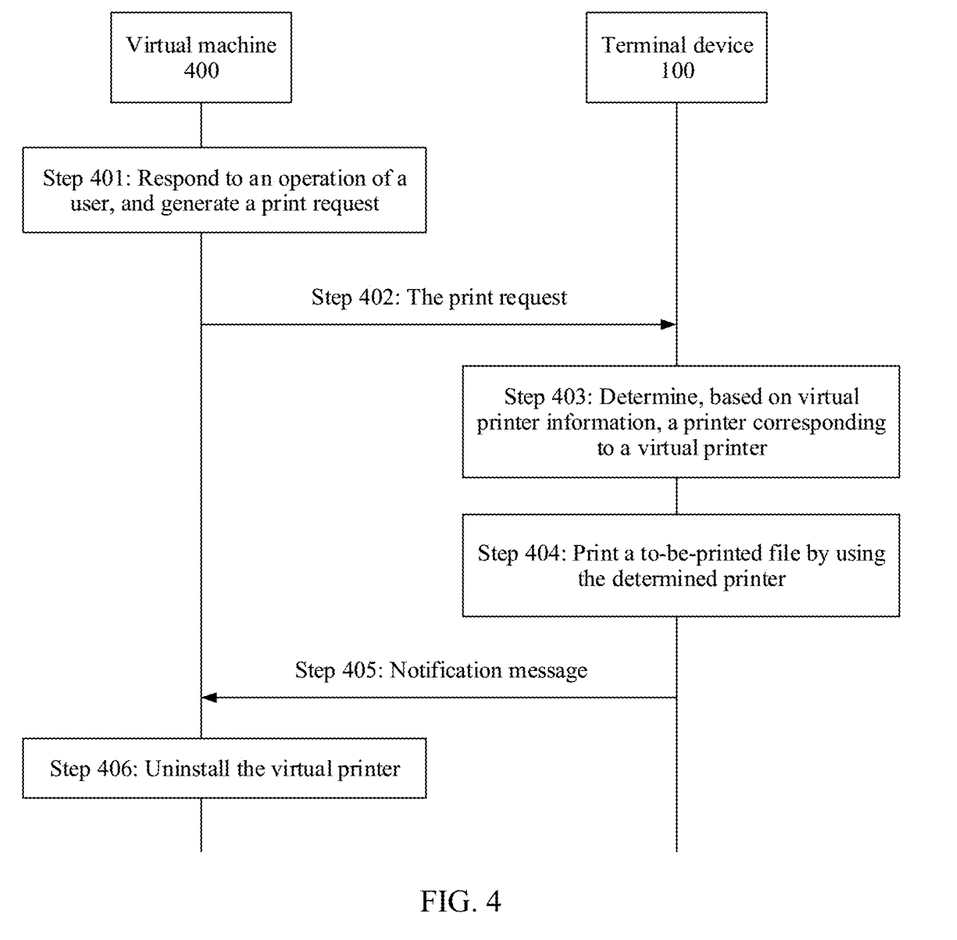
FIG. 4 is a schematic diagram of a method for printing a file on a virtual machine by using a terminal device according to an embodiment of this application.

The processor 410 invokes a program instruction stored in the memory 420 to perform an operation indicated by the program instruction, for example, a file printing method performed by the virtual machine 400 shown in FIG. 4 according to an embodiment of this application.

In this embodiment of this application, one or more virtual printers 430 may be installed on the virtual machine 400, and each virtual printer 430 on the virtual machine 400 corresponds to a printer connected to the terminal device 100.

The following describes a process of installing the virtual printers 430 on the virtual machine 400. Details are as follows.

After detecting access of a printer 300, the terminal device 100 initiates a request message to the printer 300, to request device information of the printer 300. After receiving the request message, the printer 300 feeds back the device information of the printer 300 to the terminal device 100. A quantity of printers 300 connected to the terminal device 100 is not limited in this embodiment of this application. There may be one or more printers 300.

The device information of the printer 300 includes but is not limited to an identifier of the printer 300 and configuration information supported by the printer 300. A type of the identifier of the printer 300 is not limited in this embodiment of this application. Any information that may uniquely identify the printer 300 may be used as the identifier of the printer 300. For example, the identifier of the printer 300 may be a number configured by the terminal device 100 for the printer 300. For example, the terminal device 100 may set a number for the printer 300 based on a connection sequence of the printer 300. Alternatively, the identifier of the printer 300 may be a name of the printer 300, or may be a factory serial number of the printer 300, or the like. The configuration information supported by the printer 300 is print parameters that are allowed to set for the printer 300. The configuration information supported by the printer 300 includes but is not limited to a size of a printed paper supported by the printer 300, a quantity of pages in each sheet, single-sided or double-sided printing supported by the printer 300, a size of a printed paper (such as A4, A5, and A6), page margins, a page layout (horizontal and vertical) and the like.

After the terminal device 100 accesses the virtual machine 400, the terminal device 100 obtains the device information of the printer 300 connected to the terminal device 100, generates an installation instruction, adds the device information of the printer 300 to the installation instruction, and sends the installation instruction to the virtual machine 400.

It should be noted that the terminal device 100 may send, to the virtual machine 400 by using the installation instruction, device information of all printers 300 connected to the terminal device 100, or may send, to the virtual machine 400 by using the installation instruction, device information of some printers 300 connected to the terminal device 100.

In this embodiment of this application, the terminal device 100 logs in to the virtual machine 400 by using a virtual desktop provided by the virtual machine 400, and the terminal device 100 communicates with the virtual machine 400 based on a desktop cloud protocol. The desktop cloud protocol specifies a data exchange manner between the terminal device 100 and the virtual machine 400, including a data transmission format, an encapsulation requirement, sequence numbers of transmission channels used to transmit different types of data, and the like. To perform communication by using the desktop cloud protocol, a client is installed on the terminal device 100, and is configured to receive data sent by the virtual machine 400 by using a network, and decapsulate received network data to data that can be identified by the terminal device 100. The client is further configured to send data to the virtual machine 400, and encapsulate the to-be-sent data into network data before sending. Correspondingly, the virtual machine 400 is installed on a server, and the server is configured to receive the network data sent by the terminal device 100 by using the network, and decapsulate the received network data into data that can be identified by the virtual machine 400. The server is further configured to send data to the terminal device 100, and encapsulate the to-be-sent data to network data before sending. The client and the server in this embodiment of this application are generally implemented by program instructions stored in the terminal device 100 and the virtual machine 400. In this embodiment of this application, data exchange, for example, sending and receiving of a print instruction, the installation instruction, and a notification message, between the virtual machine 400 and the terminal device 100 mentioned in this embodiment of this application may be implemented by improving the client and the server.

After receiving the installation instruction, the virtual machine 400 installs, on the virtual machine 400 based on the installation instruction, a virtual printer 430 corresponding to the device information of the printer 300 carried in the installation instruction. If the device information includes device information of one printer 300, one virtual printer 430 is installed on the virtual machine 400, and the virtual printer 430 corresponds to the printer 300. If the device information includes device information of a plurality of printers 300, a plurality of virtual printers 430 are installed on the virtual machine 400, and one virtual printer 430 corresponds to one printer 300.

To ensure that one virtual printer 430 corresponds to one printer 300, the virtual machine 400 may configure the virtual printer 430 based on the device information. For example, the virtual machine 400 may set an identifier of the virtual printer 430, and set the identifier of the virtual printer 430 to an identifier of the corresponding printer 300. The virtual machine 400 may further set attribute information of the virtual printer 430. For example, the virtual machine 400 may configure the virtual printer 430 based on the configuration information supported by the printer 300, where a configuration is the same as that of the corresponding printer 300. In this way, when a user prints a file, a configured print parameter is selected based on the configuration supported by the printer 300 corresponding to the virtual printer 430. In this manner, there is a one-to-one correspondence between the virtual printer 430 and the printer 300, and the user may select, from the virtual machine 400, the printer 300 connected to the terminal device 100 to print the file.

In a possible implementation, because configuration information supported by the plurality of printers 300 connected to the terminal device 100 is usually consistent, for example, both single-sided and double-sided printing are supported, and a plurality of pages may be printed in one sheet, when the terminal device 100 transmits the device information of the plurality of printers 300, the transmitted device information may include identifiers of the plurality of printers 300 and one piece of configuration information. In this way, a data transmission amount can be effectively reduced, and data transmission efficiency can be improved.

In another possible implementation, the device information may include only the identifier of the printer 300, and does not carry the configuration information supported by the printer 300. When the virtual printers 430 are installed on the virtual machine 400, common configuration information may be used for each virtual machine 400.

It should be noted that, in the foregoing description, an example in which the installation instruction is sent when the terminal device 100 accesses the virtual machine 400 for the first time is used for description. If the terminal device 100 has established a connection to the virtual machine 400, in this case, if a printer 300 accesses the terminal device 100, the terminal device 100 may obtain device information of the printer 300, and send the device information of the printer 300 to the virtual machine 400, to install a virtual printer 430 corresponding to the printer 300 on the virtual machine 400.

In the process, the virtual machine 400 locally installs the virtual printer 430 that is in a one-to-one correspondence with the printer 300 connected to the terminal device 100. Certainly, the virtual machine 400 may also uninstall the virtual printer 430 in real time. When the terminal device 100 detects that one or more connected printers 300 are offline, the terminal device 100 may send a notification message indicating that the printers 300 are offline to the virtual machine 400. The notification message may carry identifiers of the offline printers 300. After receiving the notification message, the virtual machine 400 may uninstall virtual printers 430 corresponding to the offline printers 300.

In this embodiment of this application, that the printers 300 are offline means that the printers 300 cannot print. There are many cases in which the printers 300 cannot print. For example, the printers 300 are in a power-off state, the printers 300 are disconnected from the terminal device 100, or the printers 300 are faulty and generate an alarm message. The states are merely examples. Any state in which the printers 300 fail to continue printing may be referred to as that the printers 300 are offline.

After the virtual printer 430 corresponding to the printer 300 connected to the terminal device 100 is installed on the virtual machine 400, the user may use the terminal device 100 to print a file on the virtual machine 400, as shown in FIG. 4.

FIG. 4 is a flowchart of a method for printing a file on the virtual machine 400 by using the terminal device 100 according to an embodiment of this application. The method includes the following steps.

Step 401: The virtual machine 400 responds to an operation of the user, and generates a print request, where the print request includes a to-be-printed file and information about the virtual printer 430.

Figure 5:
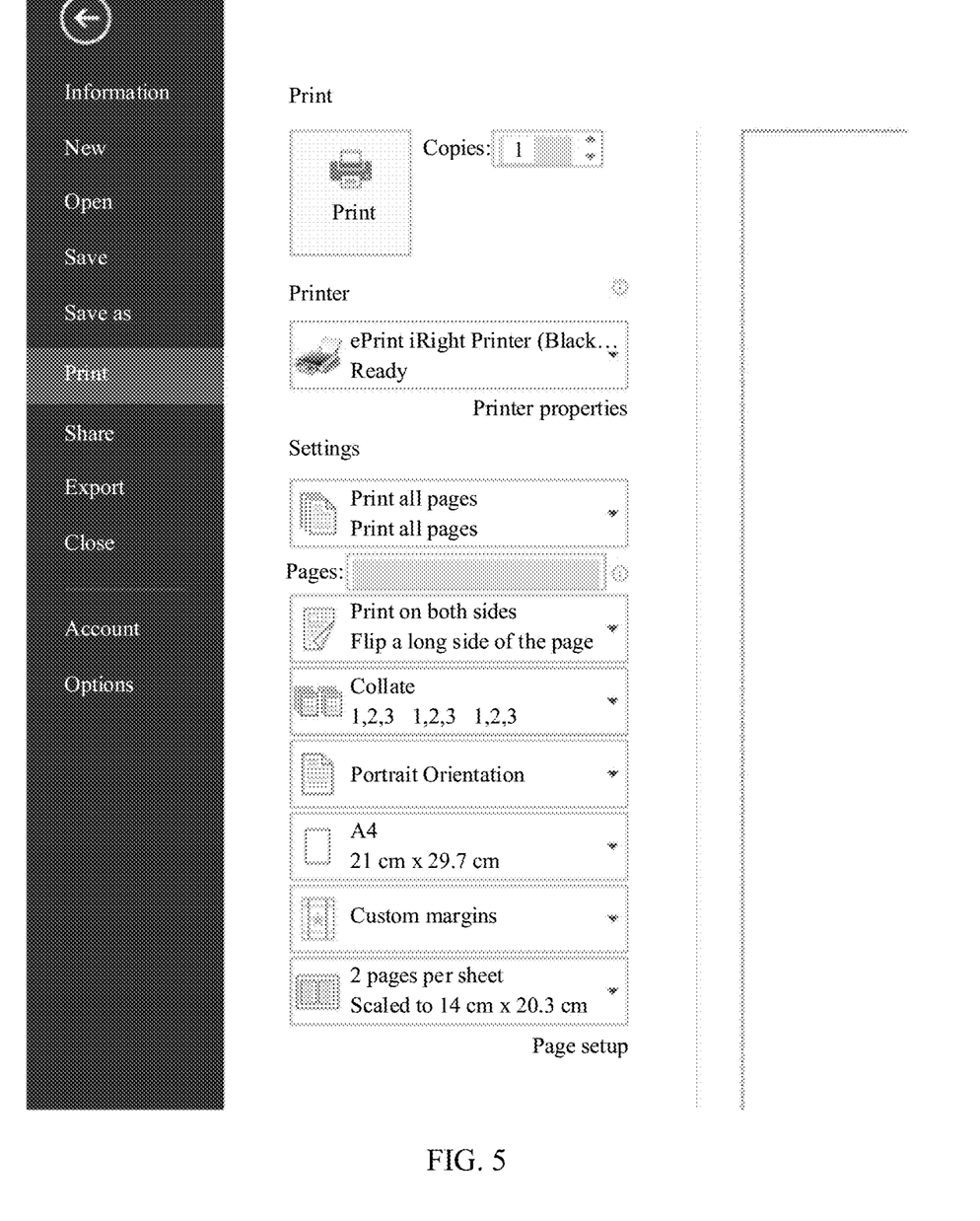
FIG. 5 is a schematic diagram of a preview screen according to an embodiment of this application.

After detecting the operation of the user, for example, opening the file, selecting a print parameter (for example, selecting single/double-sided printing, or a quantity of pages in each sheet), or selecting the virtual printer 430, the virtual machine 400 generates the print request. As shown in FIG. 5, after the user selects a print menu on a virtual desktop, the virtual machine 400 displays a print screen, and the user selects the virtual printer 430 on the print screen and sets the print parameter. After the user selects the print parameter and clicks an OK button, the virtual machine 400 generates the print request, and the print request carries the to-be-printed file and the information about the virtual printer 430. The information about the virtual printer 430 includes the identifier of the virtual printer 430, the print parameter selected by the user, and the like.

Step 402: After generating the print request, the virtual machine 400 sends the print request to the terminal device 100. The print request is used to instruct the terminal device 100 to print the to-be-printed file by using the printer 300 corresponding to the information about the virtual printer 430.

The server on the virtual machine 400 may encapsulate the to-be-printed file and the information about the virtual printer 430 based on the desktop cloud protocol, add the encapsulated to-be-printed file and the encapsulated information about the virtual printer 430 to the print request, and send the print request to the client on the terminal device 100.

Step 403: After receiving the print request, the terminal device 100 determines, based on the information about the virtual printer 430, the printer 300 corresponding to the virtual printer 430.

After receiving the print request, the client on the terminal device 100 decapsulates the print request based on the desktop cloud protocol, to obtain the to-be-printed file and the information about the virtual printer 430.

The terminal device 100 may determine, based on the information about the virtual printer 430, the printer 300 corresponding to the virtual printer 430. When the identifier of the virtual printer 430 included in the information about the virtual printer 430 is the same as the identifier of the printer 300, the terminal device 100 may determine the printer 300 corresponding to the virtual printer 430 based on the identifier of the virtual printer 430.

Step 404: The terminal device 100 prints the to-be-printed file by using the determined printer 300.

In this embodiment of the present disclosure, because the print request transmitted by the virtual machine 400 includes the information about the virtual printer 430, such as the identifier of the virtual printer 430 and the print parameter, the terminal device 100 determines, based on the identifier of the virtual printer 430, the identifier of the printer 300 for printing the file, determines, based on the print parameter in the print request, a print parameter used for printing the file, and transmits the determined identifier of the printer 300 and the print parameter to a print interface of the terminal device 100 for printing the file, so that the print interface no longer display a print screen for the user to select the printer and the print parameter. An ANDROID system installed on a terminal device is used as an example. Because the ANDROID system provides a print interface, each time when printing is performed, the print interface needs to display a print screen for the user to input a print parameter. The print interface prints a file based on the print parameter input by the user on the print screen. However, in this embodiment of the present disclosure, the print interface provided by the ANDROID system may directly receive the print parameter transmitted by the virtual machine 400 to print the file, and does not need to display the print screen for the user to select the printer and the print parameter again.

The print interface is an application programming interface (API) that is provided by a system layer and that has a print function. The terminal device 100 may invoke the API to set the print parameter.

In addition to notifying the virtual machine 400 of the device information of the printer 300 connected to the terminal device 100, the terminal device 100 may further notify the virtual machine 400 of offline information of the printer 300. For example, step 405 may be performed.

Step 405: The terminal device 100 sends a notification message indicating that the printer 300 is offline to the virtual machine 400.

When detecting that one or more printers 300 are offline, the terminal device 100 may send the notification message to the virtual machine 400. For example, the notification message may carry identifiers of the offline printers 300.

Step 406: After receiving the notification message, the virtual machine 400 uninstalls the virtual printer 430 corresponding to the printer 300.

The virtual machine 400 may determine, based on an identifier of the printer 300 carried in the notification message, the offline printer 300 and a virtual printer 430 corresponding to the printer 300, and uninstall the determined virtual printer 430 corresponding to the printer 300.

Real-time uninstallation of the virtual printer 430 is implemented by using steps 405 to 406.

In this embodiment of this application, after detecting the operation of the user, the virtual machine 400 may generate the print request, where the print request carries the to-be-printed file and the information about the virtual printer 430, and send the print request to the terminal device 100. After receiving the print request, the terminal device 100 determines the printer 300 corresponding to the virtual printer 430 based on the information about the virtual printer 430, and performs printing by using the printer 300. It can be learned from the foregoing that the virtual printer 430 installed on the virtual machine 400 is in a one-to-one correspondence with the printer 300 of the terminal device 100. When interacting with the terminal device 100, the virtual machine 400 may notify, by sending the information about the virtual printer 430, the terminal device 100 of the printer 300 corresponding to the virtual printer 430. In this way, the terminal device 100 may directly print the print file, and does not need to display the screen for the user to select the printer again. This can effectively simplify a printing process and improve printing efficiency.

Figure 6:
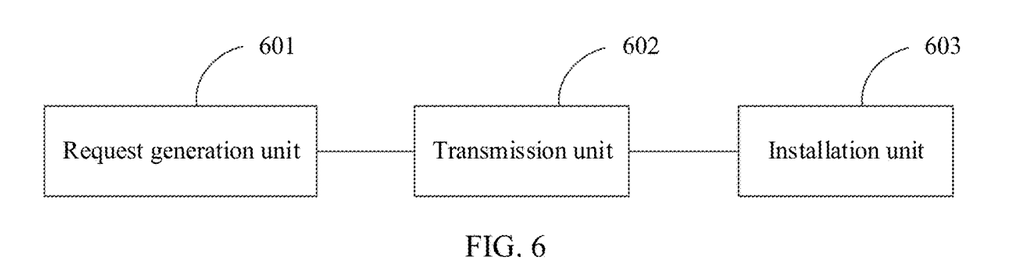
FIG. 6 is a schematic structural diagram of a virtual machine according to an embodiment of this application.

Based on a same concept as the method embodiment, an embodiment of this application further provides a virtual machine configured to perform the method performed by the virtual machine in the foregoing method embodiment. For related features, refer to the method embodiment, and details are not described herein again. As shown in FIG. 6, at least one virtual printer is installed on the virtual machine, and a user accesses the virtual machine by using a terminal device. The virtual machine includes a request generation unit 601 and a transmission unit 602. The request generation unit 601 and the transmission unit 602 are submodules of the server for the virtual machine 400.

The request generation unit 601 is configured to respond to an operation of the user, and generate a print request. The print request includes a to-be-printed file and virtual printer information, and the virtual printer information corresponds to a printer connected to the terminal device. The request generation unit 601 is further configured to perform the method performed by the virtual machine 400 in step 401 in FIG. 4.

The transmission unit 602 is configured to send the print request to the terminal device. The print request is used to instruct the terminal device to print the to-be-printed file by using the printer corresponding to the virtual printer information. The transmission unit 602 is further configured to perform the method performed by the virtual machine 400 in step 402 in FIG. 4.

Optionally, the virtual machine further includes an installation unit 603. Before the print request is generated, the transmission unit 602 may receive device information of the printer sent by the terminal device, and the device information includes an identifier of the printer. Then, the installation unit 603 may install a virtual printer on the virtual machine, and set an identifier of the virtual printer as the identifier of the printer. The installation unit 603 is also a submodule of the server.

Optionally, the device information further includes print configuration information supported by the printer. When installing the virtual printer on the virtual machine, the installation unit 603 may configure the virtual printer based on the print configuration information supported by the printer.

Optionally, the transmission unit 602 may further receive a notification message that indicates that the printer is offline and that is sent by the terminal device. The installation unit 603 may uninstall, after the transmission unit 602 receives the notification message that indicates that the printer is offline and that is sent by the terminal device, the virtual printer corresponding to the printer.

The transmission unit 602 is further configured to perform a data receiving and sending operation performed by the virtual machine 400 in a process of installing the virtual printer 430 on the virtual machine 400 in the method embodiment, and a notification message receiving operation in step 406. The installation unit 603 is further configured to perform a virtual printer installation operation performed by the virtual machine 400 in the process of installing the virtual printer 430 on the virtual machine 400 in the method embodiment, and a virtual printer uninstallation operation in step 406.

Figure 7:
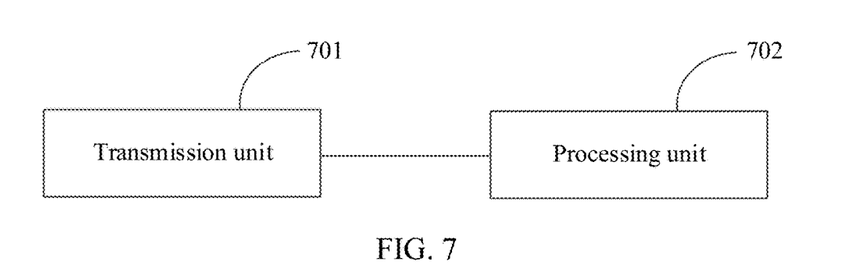
FIG. 7 is a structural diagram of a terminal device according to an embodiment of this application.

Based on the same concept as the method embodiment, an embodiment of this application further provides a terminal device configured to perform the method performed by the terminal device in the method embodiment. For related features, refer to the method embodiment, and details are not described herein again. As shown in FIG. 7, the terminal device is connected to a printer, and the terminal device includes a transmission unit 701 and a processing module 702. The transmission unit 701 and the processing module 702 are submodules of the client on the terminal device 100.

The transmission unit 701 is configured to receive a print request from a virtual machine. The print request includes a to-be-printed file and virtual printer information, and a virtual printer indicated by the virtual printer information is installed on the virtual machine and corresponds to the printer. The transmission unit 701 is further configured to perform a print request receiving operation performed by the terminal device 100 in step 403 in FIG. 4.

The processing module 702 is configured to determine, based on the virtual printer information, the printer corresponding to the virtual printer, and print the to-be-printed file by using the determined printer. The processing module 702 is further configured to perform operations of determining the printer and printing the file that are performed by the terminal device 100 in step 403 in FIG. 4.

Optionally, the processing unit 702 may obtain device information of the printer connected to the terminal device, and the device information includes an identifier of the printer. The transmission unit 701 may send an installation instruction to the virtual machine. The installation instruction includes the device information, and is used to instruct the virtual machine to install the virtual printer based on the device information.

Optionally, the device information further includes print configuration information supported by the printer.

Optionally, the processing unit 702 may detect that the printer is offline. When the processing unit 702 detects that the printer is offline, the transmission unit 701 may send a notification message indicating that the printer is offline to the virtual machine.

The transmission unit 701 is further configured to perform a data receiving and sending operation performed by the terminal device 100 in a process of installing the virtual printer 430 on the virtual machine 400 in the method embodiment, and a notification message sending operation in step 405. The processing unit 702 is further configured to perform operations of obtaining the device information of the printer and detecting that the printer is offline that are performed by the terminal device 100 in the process of installing the virtual printer 430 on the virtual machine 400 in the method embodiment.

It should be noted that, in the embodiments of this application, division into units is an example, and is merely a logical function division and may be other division in an actual implementation. Functional units in the embodiments of this application may be integrated into one processing unit, or each of the units may exist alone physically, or two or more units are integrated into one unit.

When the integrated unit is implemented in a form of a software functional unit and sold or used as an independent product, the integrated unit may be stored in a computer-readable storage medium. Based on such an understanding, the technical solutions of this application essentially, or the part contributing to other approaches, or all or some of the technical solutions may be implemented in a form of a software product. The software product is stored in a storage medium and includes several instructions for instructing a computer device (which may be a personal computer, a server, or a network device) or a processor to perform all or some of the steps of the methods described in the embodiments of this application. The storage medium includes any medium that can store program code, such as a Universal Serial Bus (USB) flash drive, a removable hard disk, a ROM, a RAM, a magnetic disk, or an optical disc.

In a simple embodiment, a person skilled in the art may figure out that the terminal device may be in a form shown in FIG. 2.

Functions/implementation processes of the processing unit 702 and the transmission unit 701 in FIG. 7 may be implemented by the processor 110 in FIG. 2 by invoking a computer-executable instruction stored in the memory 120. Alternatively, a function/implementation process of the processing unit 702 in FIG. 7 may be implemented by the processor 110 in FIG. 2 by invoking the computer-executable instruction stored in the memory 120, and a function/implementation process of the transmission unit 701 in FIG. 7 may be implemented by using a communications interface.

In a simple embodiment, a person skilled in the art may figure out that the virtual machine may be in a form shown in FIG. 3.

Functions/implementation processes of the request generation unit 601, the transmission unit 602, and the installation unit 603 in FIG. 6 may be implemented by the processor 410 in FIG. 3 by invoking a computer-executable instruction stored in the memory 420. Alternatively, functions/implementation processes of the request generation unit 601 and the installation unit 603 in FIG. 6 may be implemented by the processor 410 in FIG. 3 by invoking the computer-executable instruction stored in the memory 420, and a function/implementation process of the transmission unit 602 in FIG. 6 may be implemented by using a communications interface.

A person skilled in the art should understand that the embodiments of this application may be provided as a method, a system, or a computer program product. This application may use a form of a computer program product that is implemented on one or more computer-usable storage media (including but not limited to a disk memory, a compact disc (CD) ROM (CD-ROM), an optical memory, and the like) that include computer usable program code.

This application is described with reference to the flowcharts and/or block diagrams of the method, the device (system), and the computer program product according to the embodiments of this application. It should be understood that computer program instructions may be used to implement each process and/or each block in the flowcharts and/or the block diagrams and a combination of a process and/or a block in the flowcharts and/or the block diagrams. These computer program instructions may be provided for a general-purpose computer, a dedicated computer, an embedded processor, or a processor of another programmable data processing device to generate a machine, so that the instructions executed by the computer or the processor of the other programmable data processing device is enabled to generate an apparatus for implementing a specific function in one or more processes in the flowcharts and/or in one or more blocks in the block diagrams.

These computer program instructions may be stored in a computer-readable memory that can instruct the computer or the other programmable data processing device to work in a specific manner, so that the instructions stored in the computer-readable memory generate an artifact that includes an instruction apparatus. The instruction apparatus implements the specific function in the one or more processes in the flowcharts and/or in the one or more blocks in the block diagrams.

These computer program instructions may be loaded onto the computer or the other programmable data processing device, so that a series of operation steps are performed on the computer or the other programmable device, thereby generating computer-implemented processing. Therefore, the instructions executed on the computer or the other programmable device provide steps for implementing the specific function in the one or more processes in the flowcharts and/or in the one or more blocks in the block diagrams.

Obviously, a person skilled in the art can make various modifications and variations to the embodiments of this application without departing from the scope of this application. This application is intended to cover these modifications and variations provided that they fall within the scope of protection defined by the following claims and their equivalent technologies.

What is claimed is:

1. A method implemented by a virtual machine and comprising:
   detecting an operation of a user who has accessed the virtual machine using a terminal device distinct from the virtual machine;
   generating, in response to the operation, a print request comprising a to-be-printed file and virtual printer information, wherein the virtual printer information identifies a first virtual printer that corresponds to a printer communicatively coupled to the terminal device, wherein the print request instructs the terminal device to print the to-be-printed file using the printer, and wherein the first virtual printer is one of at least one virtual printer installed on the virtual machine;

sending the print request to the terminal device;

receiving, from the terminal device, a notification message indicating that the printer is offline; and uninstalling, responsive to receiving the notification message, the at least one virtual printer.

2. The method of claim 1, wherein before generating the print request, the method further comprises:

receiving, from the terminal device, device information of the printer, wherein the device information comprises an identifier of the printer;

installing the at least one virtual printer on the virtual machine; and setting an identifier of the virtual printer as the identifier of the printer.

3. The method of claim 2, wherein the device information further comprises print configuration information supported by the printer, and wherein the method further comprises configuring the at least one virtual printer based on the print configuration information.

4. The method of claim 1, wherein the printer is offline when the printer is at least one of in a power-off state, disconnected from the terminal device, or faulty.

5. A method implemented by a terminal device, wherein the method comprises:

receiving, from a virtual machine distinct from the terminal device, a print request comprising a to-be-printed file and virtual printer information, wherein the virtual printer information identifies a virtual printer that is installed on the virtual machine and that corresponds to a printer communicatively coupled to the terminal device;

selecting, based on the virtual printer information, the printer;

printing the to-be-printed file using the printer;

detecting that the printer is offline; and sending, to the virtual machine and in response to detecting that the printer is offline, a notification message indicating that the printer is offline.

6. The method of claim 5, further comprising:

obtaining device information of the printer, wherein the device information comprises an identifier of the printer; and sending, to the virtual machine, an installation instruction instructing the virtual machine to install the virtual printer based on the device information, wherein the installation instruction comprises the device information.

7. The method of claim 6, wherein the device information further comprises print configuration information supported by the printer.

8. The method of claim 5, wherein the printer is offline when the printer is at least one of in a power-off state, disconnected from the terminal device, or faulty.

9. A virtual machine comprising:

at least one virtual printer installed on the virtual machine;

a request generator configured to:

detect an operation of a user who has accessed the virtual machine using a terminal device distinct from the virtual machine;

generate, in response to the operation, a print request comprising a to-be-printed file and virtual printer information, wherein the virtual printer information identifies a first virtual printer that corresponds to a printer coupled to the terminal device, wherein the print request instructs the terminal device to print the to-be-printed file using the printer, and wherein the first virtual printer is one of the at least one virtual printer installed on the virtual machine;

a transmitter configured to send the print request to the terminal device;

a receiver configured to receive, from the terminal device, a notification message indicating that the printer is offline; and an installer configured to uninstall, responsive to receiving the notification message, the at least one virtual printer.

10. The virtual machine of claim 9, wherein the receiver is configured to receive, from the terminal device, device information of the printer before generating the print request, wherein the device information comprises an identifier of the printer, and wherein the installer is configured to:

install the at least one virtual printer on the virtual machine; and set an identifier of the at least one virtual printer as the identifier of the printer.

11. The virtual machine of claim 10, wherein the device information further comprises print configuration information supported by the printer, and wherein the installer is further configured to configure the at least one virtual printer based on the print configuration information.

12. The virtual machine of claim 9, wherein the printer is offline when the printer is at least one of in a power-off state, disconnected from the terminal device, or faulty.

13. A terminal device comprising:

a memory configured to store instructions; and a processor coupled to the memory and configured to execute the instructions to cause the terminal device to be configured to:

receive, from a virtual machine distinct from the terminal device, a print request comprising a to-be-printed file and virtual printer information, wherein the virtual printer information identifies a virtual printer that is installed on the virtual machine and that corresponds to a printer coupled to the terminal device;

select, based on the virtual printer information, the printer;

print the to-be-printed file using the printer;

detect that the printer is offline; and send, to the virtual machine and in response to detecting that the printer is offline, a notification message indicating that the printer is offline.

14. The terminal device of claim 13, wherein the instructions further cause the processor to be configured to:

obtain device information of the printer, wherein the device information comprises an identifier of the printer; and send, to the virtual machine, an installation instruction instructing the virtual machine to install the virtual printer based on the device information, wherein the installation instruction comprises the device information.

15. The terminal device of claim 14, wherein the device information further comprises print configuration information supported by the printer.

16. The terminal device of claim 13, wherein the printer is offline when the printer is at least one of in a power-off state, disconnected from the terminal device, or faulty.

17. A file printing system comprising:
a terminal device; and
a virtual machine distinct from and communicatively coupled to the terminal device and comprising at least one virtual printer, wherein the virtual machine is configured to:
  detect an operation of a user who has accessed the virtual machine using the terminal device;
  generate, in response to the operation, a print request comprising a to-be-printed file and virtual printer information, wherein the virtual printer information identifies a printer communicatively coupled to the terminal device, wherein the print request instructs the terminal device to print the to-be-printed file using the printer, and wherein the firsta first virtual printer is one of the at least one virtual printer installed on the virtual machine; and
  send the print request to the terminal device,
wherein the terminal device is configured to:
  receive the print request from the virtual machine;
  select, based on the virtual printer information, the printer;
  print the to-be-printed file using the printer;
  detect that the printer is offline; and
  send, to the virtual machine and in response to detecting that the printer is offline,
a notification message indicating that the printer is offline.

18. The file printing system of claim 17, wherein the virtual machine is further configured to:
  receive, from the terminal device, device information of the printer, wherein the device information comprises an identifier of the printer;
  install the at least one virtual printer on the virtual machine; and
  set an identifier of the virtual printer as the identifier of the printer.

19. The file printing system of claim 17, wherein the terminal device is further configured to:
  obtain device information of the printer, wherein the device information comprises an identifier of the printer; and
  send, to the virtual machine, an installation instruction instructing the virtual machine to install the at least one virtual printer based on the device information, wherein the installation instruction comprises the device information.

20. The file printing system of claim 17, further comprising a server configured to deploy the virtual machine, wherein the server is communicatively coupled to the terminal device using a wireless network or a wired network.

21. The file printing system of claim 17, wherein the printer is offline when the printer is at least one of in a power-off state, disconnected from the terminal device, or faulty.

* * * * *

UNITED STATES PATENT AND TRADEMARK OFFICE
CERTIFICATE OF CORRECTION

| | |
|---|---|
| PATENT NO. | : 12,001,728 B2 |
| APPLICATION NO. | : 17/536844 |
| DATED | : June 4, 2024 |
| INVENTOR(S) | : Junjie Li and Qingling Duan |

It is certified that error appears in the above-identified patent and that said Letters Patent is hereby corrected as shown below:

In the Claims

Claim 17, Column 17, Line 15: "wherein the firsta first" should read "wherein a first"

Signed and Sealed this
Thirtieth Day of July, 2024

Katherine Kelly Vidal
*Director of the United States Patent and Trademark Office*